United States Patent [19]
Brandner et al.

[11] Patent Number: 6,079,771
[45] Date of Patent: Jun. 27, 2000

[54] COVER OF AN OPENABLE MOTOR VEHICLE ROOF AND MOTOR VEHICLE ROOF EQUIPMENT THEREWITH

[75] Inventors: Hans Brandner, Dachau; Hans Jardin, Inning; Thomas Schröferl, Hohenschäftlarn; Volker Petri, Aidlingen; Reinhold Mickeler, Altdorf; Werner Herlemann; Hans Benda, both of Aidlingen, all of Germany

[73] Assignees: Webasto Systemkomponenten GmbH, Stockdorf; Daimler Benz AG, Stuttgart, both of Germany

[21] Appl. No.: 09/217,192

[22] Filed: Dec. 22, 1998

[30] Foreign Application Priority Data

Dec. 23, 1997 [DE] Germany .............................. 197 57 454

[51] Int. Cl.[7] ........................................................ B60J 7/00
[52] U.S. Cl. ...................... 296/216.09; 49/27; 200/61.43
[58] Field of Search ........................ 296/216.06, 216.09, 296/223; 49/27; 200/61.43; 318/468

[56] References Cited

U.S. PATENT DOCUMENTS

| 5,050,928 | 9/1991 | Bohm et al. ..................... 296/216.09 |
| 5,087,799 | 2/1992 | Pariot et al. ......................... 200/61.43 |
| 5,592,060 | 1/1997 | Racine et al. .......................... 49/27 X |

FOREIGN PATENT DOCUMENTS

| 44 27 537 | 2/1996 | Germany . |
| 297 04 030 U | 7/1997 | Germany . |

*Primary Examiner*—Dennis H. Pedder
*Attorney, Agent, or Firm*—Nixon Peabody LLP; David S. Safran

[57] ABSTRACT

A cover of an openable motor vehicle roof includes a cover plate which is surrounded by a plastic frame formed by foaming or injection, and which connects at least one attachment part to the cover plate. The plastic frame includes at least one sensor element which is located on one wall of the attachment part and which signals pinching of a body part or article when the closes on an object by partial deformation of the plastic frame.

19 Claims, 2 Drawing Sheets

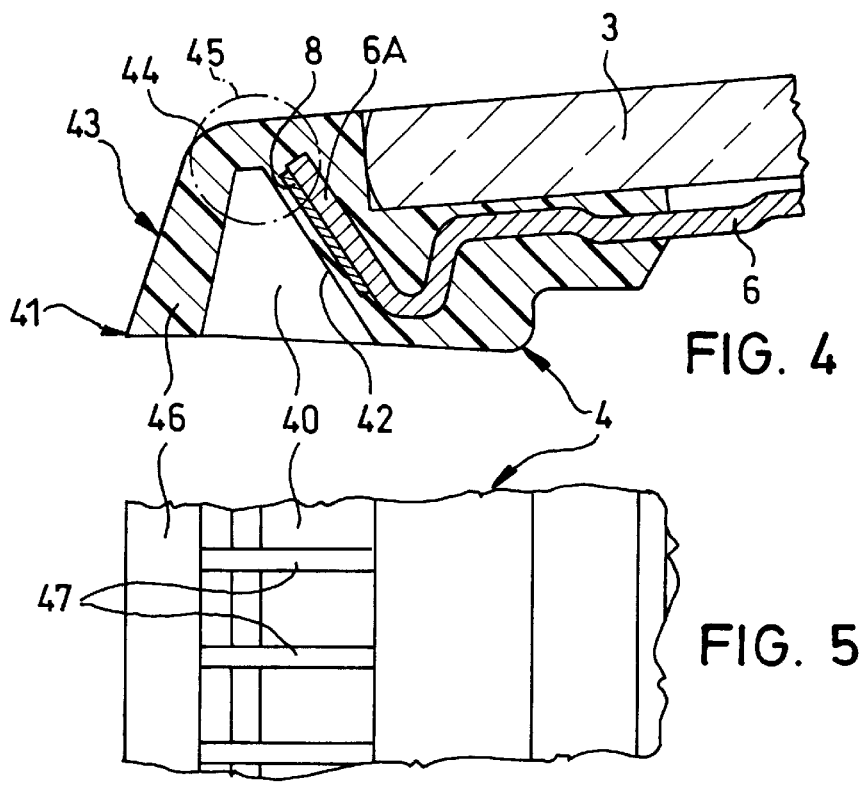
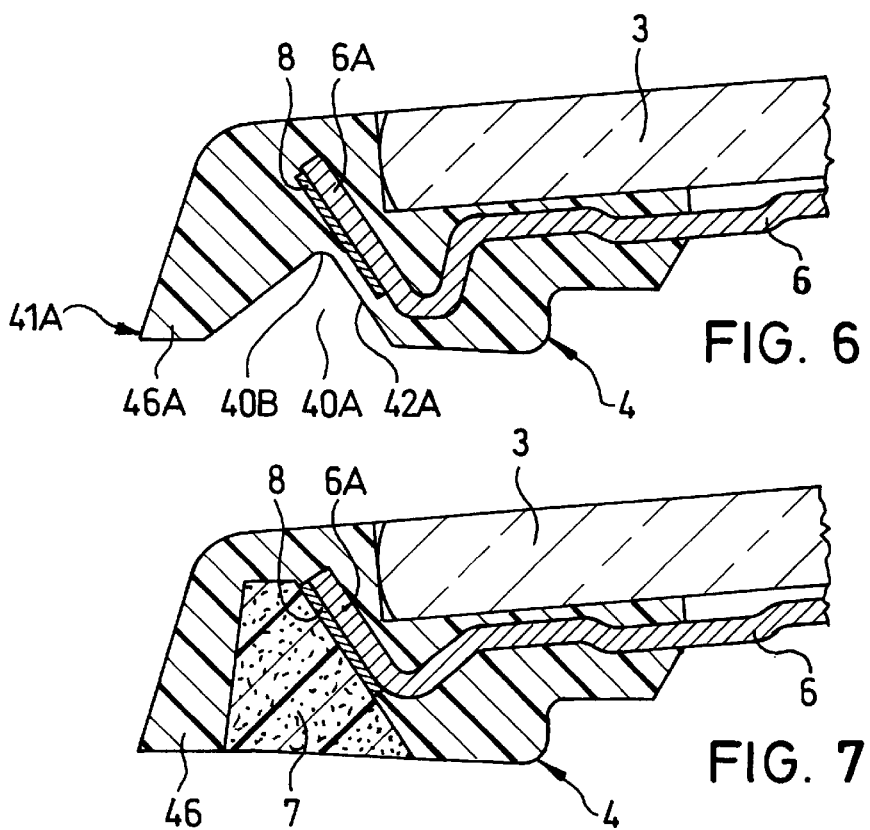

COVER OF AN OPENABLE MOTOR VEHICLE ROOF AND MOTOR VEHICLE ROOF EQUIPMENT THEREWITH

BACKGROUND OF THE INVENTION

1. Field of the Invention

The invention relates to a cover of an openable motor vehicle roof. More specifically, the invention is a cover for an openable motor vehicle roof that seals when an object is pinched by the cover.

2. Description of Related Art

German Utility Model DE 297 04 030 U1 discloses a cover of a sliding vehicle roof in which a transparent pane cover plate, and an attachment part which lies underneath the pane are joined to one another at edges thereof by a plastic frame attached by a foaming or injection process. The plastic frame has a contour formed on a periphery thereof for holding a sealing part.

The sealing part can be hollow, as disclosed in published German Patent Application DE 44 27 537 A1, and a pressure-sensitive, strip-shaped sensor element integrated therein for detecting pinching when the cover closes. Insertion of the sensor element into the hollow seal part and attachment of the seal to the cover require expensive production and installation steps which make the production of a sliding roof cover expensive.

SUMMARY OF THE INVENTION

The object of this invention is to provide a cover for an openable motor vehicle roof which has means for detecting pinching and which can be economically produced.

To achieve this object, the invention includes, a pressure-sensitive sensor element directly integrated into an at least partially deformable plastic frame of the cover, the frame being attached by a foaming or injection process. The arrangement of the sensor element on a stiffening or attachment part, which must be positioned in the manufacture of the plastic frame in the molding tool, enables especially simple positioning and connection of a sensor element to the cover. The sensor element is supported with its back on a stiff attachment part. In this way, pressure sensitivity on the front side of the sensor element is increased. Furthermore, a protected arrangement of the sensor element is enabled because the plastic frame which covers the sensor element has greater stability than, for example, a rubber seal. Finally, it is also much easier to provide communication between the sensor element and the evaluation logic since the electrical terminal connections can be easily embedded in the plastic frame during injection or foaming around the glass pane and the reinforcing parts at the same time.

Preferably, the wall of the frame on which the sensor element is located is tilted obliquely downwards from the outside to the inside. This provides favorable transfer of forces from a pinched item to the sensor element, particularly if a V-shaped or trapezoidal groove is formed in the frame. This arrangement of the sensor element sloping downwards obliquely from top to bottom is best suited both for detecting of pinching on the front edge of a sliding roof cover which is closing and also for detecting pinching on the rear edge of the lowering cover of a sliding and lifting roof or lifting roof.

According to one aspect of the invention, on the bottom of the plastic frame, in the area of the sensor element, there is a groove. This groove can be produced, for example, by a tool in the course of peripheral foaming or injection.

The force can be applied to the sensor element in a particularly efficient manner when the groove base runs roughly at the height of the middle of the sensor element. When the outside edge of the plastic frame is deformed in the case of pinching, especially favorable lever conditions for transfer of force to the sensor element arise.

Preferably, the sensor element is fixed before peripheral foaming or injection of the cover plate, for example, by cementing on the stiffening or attachment part, so that it is also directly positioned jointly therewith in the form tool. The sensor element however can likewise be equally well attached alternatively in a groove produced during peripheral injection or foaming by means of a form tool at a later time, for example, by cementing on one wall of the attachment part which borders the groove.

According to another aspect of the invention the groove is interrupted by the transversely running ribs of the plastic frame. These ribs are used to transfer force from the outside edge of the plastic frame to the sensor element.

According to another aspect of the invention, the groove is filled by an elastic material which is softer than the material of the plastic frame. Favorable gradation calls for the plastic frame to consist of polyurethane with a Shore hardness of roughly 90, while the softer material has a Shore hardness of roughly 30. This filling with a softer material can be accomplished by a two-component injection process. The softer elastic material is used, on the one hand, to cover the sensor element, and on the other hand, to transfer the compressive forces acting on the outside edge of the frame to the sensor element, alternatively or additionally to the direct action of deformation of the outside edge or the transverse ribs of the plastic frame to the sensor element.

For easier transfer of compressive forces, it is advantageous if one bearing surface on the outside edge of the cover is sloped obliquely downward. This facilitates deformation of the plastic frame and thus detection of a case of pinching by the contact of a pinched item along a line on the projecting lower outside edge of the cover.

The sensor element which is preferably made in a strip shape extends in a cover of a sliding roof at least in the area of the front edge, and in a cover with a rear edge which can be raised over the solid vehicle roof, such as a sliding and lifting roof or a lifting roof, also at least over one part of the area of the rear edge. However, the sensor element can also be located peripherally along the entire outside circumference of the cover.

BRIEF DESCRIPTION OF THE DRAWINGS

FIG. 4 is an enlarged detailed view of FIG. 2;

FIG. 5 is a partial view of the cover edge from underneath to illustrate the additional transverse ribs in the area of the groove;

FIG. 6 is a sectional view of an alternative embodiment with a modified groove shape; and FIG. 7 is a sectional view of an embodiment in which the groove of the plastic frame is filled with a softer material.

DETAILED DESCRIPTION OF THE INVENTION

Figure 1:
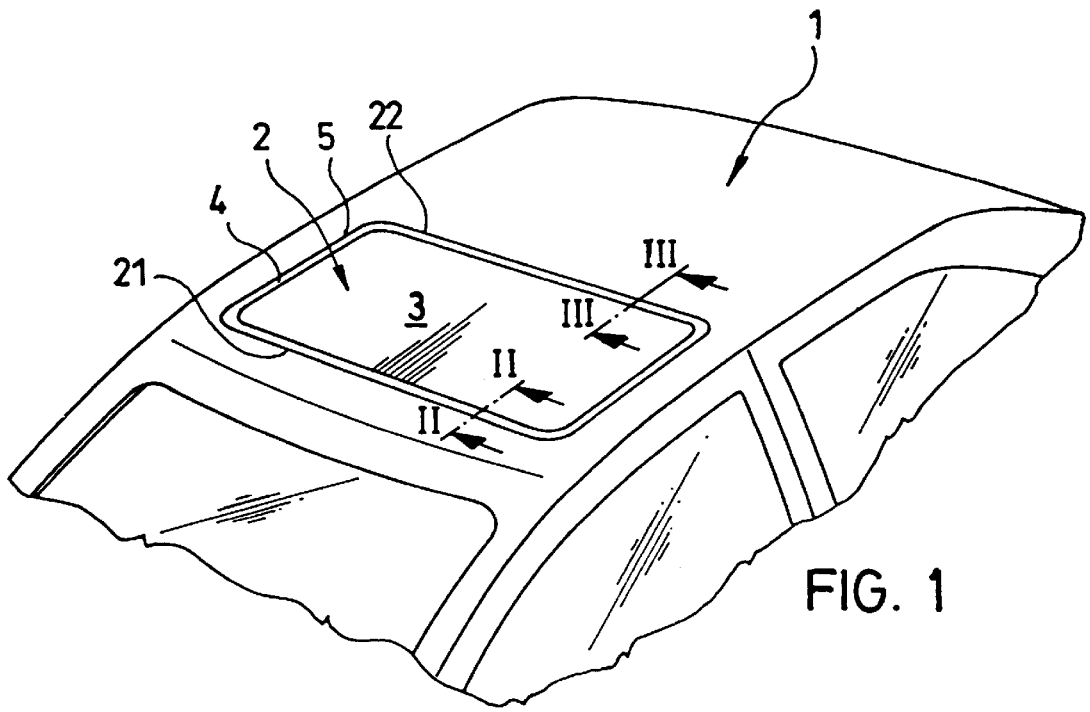
FIG. 1 is a perspective view of an openable motor vehicle roof.

As illustrated in FIG. 1, a fixed motor vehicle roof 1 has a roof opening 5 which can be selectively closed or at least partially exposed by means of a cover 2. In this case, cover 2 is disposed on a sliding and lifting roof with a rear edge which can be raised over the fixed motor vehicle roof 1 by means of a mechanism (not shown) in the side area of the cover, and which can be lowered under the solid motor vehicle roof 1 and moved to the rear.

Figure 2:
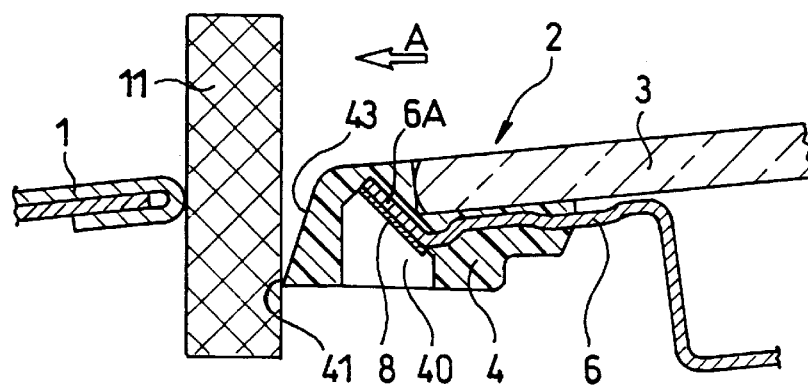
FIG. 2 is a sectional view taken along line II—II of FIG. 1 of the front edge of the cover and the adjacent motor vehicle roof with an article pinched between them.
Figure 3:
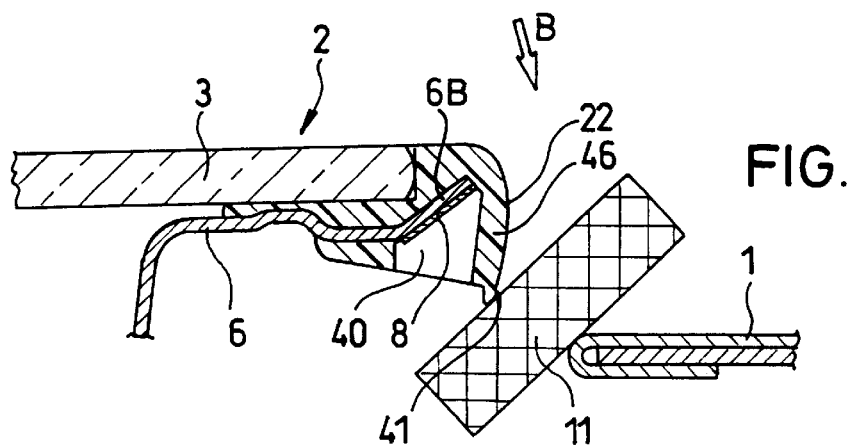
FIG. 3 is a sectional view taken along line III—III of FIG. 1 with a pinched article in the area of the rear edge of the cover.

As shown in FIGS. 2 and 3, during a motorized closing process articles 11 or body parts could become pinched both between the front edge of cover 2 and roof 1 (FIG. 2) and also between the rear edge of the cover 2 and the roof 1 (FIG. 3).

For motor vehicle parts which close automatically, regulations often require monitoring by means of sensors which, in the case of pinching, limit the pinching force to 100 N.

Cover 2 is composed of cover plate 3 which preferably is made of glass, or of transparent plastic, an inner cover sheet 6 defining a stiffening and/or attachment part located in the area of the outside edge, and a plastic frame 4 which links cover plate 3 and inner cover sheet 6 and which is produced by foaming or injection around cover plate 3 and inner cover sheet 6 in a mold.

At least one integral strip-shaped sensor element 8 is located on one wall of inner cover sheet 6 facing the outside edge of cover 2 and inside plastic frame 4 and which is actuated when the cover 2 closes on an object by partial deformation of plastic frame 4, and thus, signals pinching of a body part or article 11. Sensor element 8 can be, for example, a FSR (force sensing resistor) element as disclosed in published German Patent Application DE 44 27 537 A1. One such sensor element changes its resistance under pressure so that deformation which indicates pinching can be easily recognized by monitoring an electric signal.

A groove 40 is formed in plastic frame 4, is open to the bottom and can be made roughly V-shaped or trapezoidal. Groove 40 adjoins an outside peripheral bridge 46 of the plastic frame 4 (see FIG. 4); the outside bearing surface 43 of plastic frame 4 is sloped from top to bottom obliquely outwardly. The underlying outside edge 41 which projects the farthest as shown in FIG. 2, first comes into contact with a pinched article 11 due to movement in the direction of the arrow A. Bearing surface 43 abuts the solid motor vehicle roof 1 or a seal which is located thereon and which is not shown when roof opening 5 is closed.

As is shown in FIGS. 2 to 7, sensor element 8 is preferably located on wall 42 of groove 40. Wall 42 runs from outside to inside sloped obliquely to the bottom of cover 2. The back of sensor element 8 is always supported against a rigid wall 6A or 6B in the outside region of the inside cover sheet 6, i.e. the region beveled obliquely to the top. This wall directly borders groove 40 in FIGS. 2, 3 and 7. In FIGS. 4 and 6, sensor element 8 is covered on a side near groove 40 or 40A by a relatively thin layer of the material of plastic frame 4. Sensor element 8 is preferably fixed on the wall 6A or 6B of inside cover sheet 6 by cementing. Cementing can be done before peripheral foaming or injection. Alternatively, in the embodiments shown in FIGS. 2, 3 and 7, it is also possible to arrange the sensor element subsequently on wall 6A or 6B of inside cover sheet 6, and in turn to fix it, for example, by cementing or by foaming groove 40 with a softer material 7.

Region 44 of plastic frame 4 which extends above the base of groove 40 is formed with a relatively thin wall in FIGS. 2–4 and 7 and acts like an elastic hinge when outside edge 41 encounters a pinched article 11, so that bridge 46 can bend relatively easily to the inside. In doing so, sensor element 8 is deformed especially in its upper area in region within the circle labeled as 45. The deformation of sensor element 8 causes a perceptible change of resistance to occur.

The transfer of compressive forces from pinched article 11 to sensor element 8 can additionally accomplished by transverse ribs 47 which, spaced apart in the area of groove 40, join bridge 46 to inside wall 42 (FIG. 5).

According to another alternative shown in FIG. 6, groove 40A which is preferably V-shaped in cross section ends with its groove base 40B roughly at a height corresponding to the middle of sensor element 8. When outside edge 41A is deformed as a result of pinching, bridge 46A is bent to the inside, favorable lever conditions for efficient transfer of force to sensor element 8 result from the arrangement of the groove base 40B. Inside wall 42A of the groove has a relatively thin layer overlapping a lower portion of sensor element 8. The embodiment shown in FIG. 6 can be produced economically because sensor element 8 can be attached directly, for example, by cementing, to wall 6A of inner cover sheet 6 and is positioned jointly therewith in the mold for foaming or injection around inner cover sheet 6. Sensor element 8 is surrounded completely only by the material of plastic frame 4 and thus is very well protected. Additional transverse ribs 47 can be omitted in the embodiment shown in FIG. 6.

As shown in FIG. 7, the entire area of groove 40 or 40A can be filled with a material which is softer than the material of plastic frame 4 and which, when bridge 46 is deformed, acts as an elastic buffer for transfer of compressive force to sensor element 8.

Just as in pinching between the front edge and an edge of openings as shown in FIGS. 2 or 4, when the rear edge of cover 2 is lowered in the direction of arrow B in FIG. 3, a pinched article 11 is detected by means of sensor element 8 by the deformation of the bearing surface 43, and if necessary, softer material 7 which is present in the groove 40 or 40A.

Upper edge 44 of the plastic frame 4 is conventionally flush with the upper edge of cover plate 3. Inner cover sheet 6 is used to stiffen cover 2 and to attach additional lateral screens or to connect the actuation mechanism of cover 2 by means of lifting levers or cranks. Inner cover sheet 6 can be made of one or more parts.

Cover 2 is produced in an injection or casting mold into which cover plate 3 and inner cover sheet 6 are inserted; a two-part process dictating the outside contour of plastic frame 4. Sensor element 8 is preferably integrated into plastic frame 4 during injection, casting or peripheral foaming. However, sensor element 8 can be attached to wall 6A or 6B of inner cover sheet 6 after injection, casting or peripheral foaming and can be fixed optionally during injection or foaming of material 7.

Groove 40 or 40A is formed by a fixed tool part or a movable tool part in the form of a slide which forms the groove when moved out of the main tool. Groove 40 can be filled with material 7 in the course of the 2-component injection or foaming process. Polyurethane (PU) with a Shore hardness of roughly 90 is well suited as the material for the plastic frame 4. For material 7 a PU foam with a Shore hardness of roughly 30 is appropriate.

Instead of inserting sensor element 8 along with inside cover sheet 6 into the plastic frame 4 during injection or foaming or casting, sensor element 8 can be inserted subsequently by being cemented into groove 40. The insertion of material 7 into groove 40 can also be accomplished in a separate step. Instead of attaching sensor element 8 to a reinforcing or attachment part, especially in the case of a thicker cover plate 3, sensor element 8 can be attached to the outside edge of cover plate 3. It is desirable to support sensor element 8 on a rigid wall of part of cover 2 which is positioned during injection or foaming or casting proximate plastic frame 4 in the mold so that the position of sensor element 8 can be accurately defined, regardless of whether attachment thereof occurs before or after peripheral injection, foaming or casting. Stable support of sensor element 8, prevents sensor element 8 prevents sensor 8 from yielding laterally when plastic frame 4 is deformed, thus clearly increasing the responsiveness of sensor element 8 in when pinching occurs.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A cover for an openable motor vehicle roof, said cover comprising:
   a cover plate and at least one attachment part coupled to said cover plate, said attachment part having a rigid wall which faces outward relative to a peripheral edge of the cover plate;
   a frame disposed around the peripheral edge of said cover plate; and
   a sensor element for detecting a pinching process which is mounted on said rigid wall of said attachment part and which faces an outside edge of said cover plate;
   wherein said frame is a molded part which has been formed by one of foaming and injection molding, and wherein said attachment part is embedded in said molded part and is connected to said cover plate by said molded part having been formed around the attachment part and the peripheral edge of said cover plate.

2. A cover as recited in claim 1, wherein said wall of said attachment part slopes obliquely downwards in a direction from an upper outer corner of said frame toward a lower inner corner of said frame.

3. A cover as recited in claim 1, wherein said frame has a groove formed therein proximate said sensor element.

4. A cover as recited in claim 3, wherein said groove is open to the bottom of said cover.

5. A cover as recited in claim 2, wherein the groove extends into said frame to a height of a middle portion of said sensor element.

6. A cover as recited in claim 3, further comprising transversely extending ribs disposed in said groove.

7. A cover as recited in claim 1, wherein said frame is made of a plastic having a Shore hardness of about 90.

8. A cover as recited in claim 3, wherein said frame is made of a plastic having a Shore hardness of about 90, and further comprising a material disposed in said groove, which is softer than the plastic of said frame.

9. A cover as recited in claim 8, wherein said softer material has a Shore hardness of about 30.

10. A cover as recited in claim 1, wherein said sensor element is cemented to said attachment part.

11. cover for an openable motor vehicle roof, said cover comprising:
    a cover plate and at least one attachment part coupled to said cover plate;
    a frame disposed around a periphery of said cover plate; and
    a sensor element for detecting a pinching process on a wall of said attachment part, said sensor element facing an outside edge of said cover plate;
    wherein said frame has been formed by one of foaming and injection molding, and by which said attachment part has been connected to said cover plate; and wherein said sensor element is covered by a portion of said frame.

12. A cover as recited in claim 8, wherein said soft material has been introduced and fixed within said groove by injection molding.

13. An openable motor vehicle roof comprising a fixed vehicle roof, an opening formed in the fixed vehicle roof and a movable cover plate mounted in said opening; wherein at least one attachment part is coupled to said cover plate, said attachment part having a rigid wall which faces outward relative to a peripheral edge of the cover plate; wherein a frame is disposed around said peripheral edge of said cover plate; and wherein a sensor element for detecting a pinching process is provided on said rigid wall of said attachment part and faces an outside edge of said cover plate; and wherein said frame is a molded part; and wherein said attachment part is embedded in said molded part and is connected to said cover plate by said molded part having been formed around the attachment part and the peripheral edge of said cover plate.

14. Vehicle roof as claimed in claim 13, wherein a groove is formed in an underside of the frame proximate said sensor element.

15. Vehicle roof as claimed in claim 14, wherein said groove extends into said frame to a height of a middle portion of said sensor element.

16. Vehicle roof as claimed in claim 15, wherein said frame is made of a plastic having a Shore harness of about 90.

17. Vehicle roof as claimed in claims 16, wherein the groove is filled with an elastic material which is softer than the plastic of the frame.

18. Vehicle roof as claimed in claim 17, wherein the softer material has a Shore hardness of about 30.

19. Vehicle roof as claimed in claim 14, wherein said sensor element is cemented to said attachment part.

* * * * *